(12) United States Patent
Fujiwara et al.

(10) Patent No.: US 9,523,798 B2
(45) Date of Patent: Dec. 20, 2016

(54) ELEMENT ARRAY AND ELEMENT ARRAY LAMINATE

(75) Inventors: Takayuki Fujiwara, Kanagawa (JP); Seiichi Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1282 days.

(21) Appl. No.: 13/499,458

(22) PCT Filed: Jul. 6, 2010

(86) PCT No.: PCT/JP2010/061492
§ 371 (c)(1),
(2), (4) Date: Mar. 30, 2012

(87) PCT Pub. No.: WO2011/040103
PCT Pub. Date: Apr. 7, 2011

(65) Prior Publication Data
US 2012/0189800 A1 Jul. 26, 2012

(30) Foreign Application Priority Data
Sep. 30, 2009 (JP) ................................ 2009-227249

(51) Int. Cl.
*B32B 5/00* (2006.01)
*G02B 3/00* (2006.01)
*B29D 11/00* (2006.01)

(52) U.S. Cl.
CPC ....... *G02B 3/0031* (2013.01); *B29D 11/00298* (2013.01); *G02B 3/0056* (2013.01); *G02B 3/0062* (2013.01); *Y10T 428/22* (2015.01)

(58) Field of Classification Search
CPC ... G02B 3/0056; G02B 3/0043; G02B 13/001; G02B 13/003; G02B 13/0085; G02B 27/2214; G02B 27/2221; G02B 3/0025; G02B 3/0031; G02B 3/005; G02B 3/0062; G02B 3/0068; G02B 3/14; G02B 5/021; G02B 5/0268; G02B 5/0284; G02B 5/128; G02B 5/13; G02B 5/201; G02B 7/022; B29D 11/00278; B29D 11/00265; B29D 11/00275; B29D 11/0048; B29D 11/00298; B29K 2019/00; B29K 2021/11; B29K 2011/0016; G02F 1/133553; G02F 2203/03; G03B 21/60; G09F 3/0292; Y10T 428/22

(Continued)

(56) References Cited

U.S. PATENT DOCUMENTS 4,783,141 A * 11/1988 Baba et al. ................... 359/619
8,023,208 B2 * 9/2011 Shyu et al. ................... 359/811
(Continued)

FOREIGN PATENT DOCUMENTS

CN 1457446 A 11/2003
CN 1517736 A 8/2004
(Continued)

OTHER PUBLICATIONS

International Search Report (PCT/ISA/210) issued on Sep. 21, 2010 in the International Patent Application No. PCT/JP2010/061492.
(Continued)

*Primary Examiner* — Bumsuk Won
*Assistant Examiner* — Grant Gagnon
(74) *Attorney, Agent, or Firm* — Sughrue Mion, PLLC

(57) ABSTRACT

Provided is an element array in which an error in pitch among elements in the element array is absorbed surely in a step of laminating a plurality of element arrays so that each group of the elements arrayed in the laminating direction can be aligned with high accuracy. The element array has a plurality of elements arrayed one-dimensionally or two-dimensionally, and a flexible support formed out of a material richer in elasticity than a material forming the elements.

(Continued)

The elements are coupled with one another through the support.

16 Claims, 14 Drawing Sheets

(58) Field of Classification Search
USPC .................................................. 359/619–628
See application file for complete search history.

(56) References Cited

U.S. PATENT DOCUMENTS

| | | | |
|---|---|---|---|
| 8,120,858 B2* | 2/2012 | Choi et al. .................... | 359/642 |
| 2003/0039035 A1* | 2/2003 | Yoshikawa et al. .......... | 359/619 |
| 2003/0133078 A1 | 7/2003 | Iechika et al. | |
| 2004/0047274 A1 | 3/2004 | Amanai | |
| 2004/0212719 A1 | 10/2004 | Ikeda et al. | |
| 2005/0030647 A1 | 2/2005 | Amanai | |
| 2005/0275946 A1* | 12/2005 | Choo ............... | B29D 11/00365 |
| | | | 359/619 |
| 2009/0021836 A1* | 1/2009 | Koch ........................... | 359/619 |
| 2009/0097114 A1* | 4/2009 | Mimura et al. .............. | 359/463 |
| 2010/0181691 A1 | 7/2010 | Yoshida | |
| 2011/0176217 A1* | 7/2011 | Fujii et al. .................... | 359/619 |
| 2012/0189800 A1* | 7/2012 | Fujiwara et al. ............. | 428/67 |

FOREIGN PATENT DOCUMENTS

| | | |
|---|---|---|
| JP | 03329808 A | 11/2003 |
| JP | 200429554 A | 1/2004 |
| JP | 200488713 A | 3/2004 |
| JP | 2004-233482 A | 8/2004 |
| JP | 2004226872 A | 8/2004 |
| JP | 2004233482 A | 8/2004 |
| JP | 2007199495 A | 8/2007 |
| JP | 4190204 B2 | 12/2008 |
| JP | 2009-524919 A | 7/2009 |
| WO | 2008153102 A1 | 12/2008 |

OTHER PUBLICATIONS

Written Opinion (PCT/ISA/237) issued on Sep. 21, 2010 in the International Patent Application No. PCT/JP2010/061492.

Office Action dated Feb. 27, 2014 issued by the State Intellectual Property Office of People's Republic of China in counterpart Chinese Patent Application No. 201080043880.0.

Office Action dated Nov. 30, 2015 issued by the Korean Intellectual Property Office in counterpart Korean Patent Application No. 10-2012-7007876.

* cited by examiner

ELEMENT ARRAY AND ELEMENT ARRAY LAMINATE

TECHNICAL FIELD

The present invention relates to an element array and an element array laminate.

BACKGROUND ART

In recent years, a small-size and low-profile imaging unit has been mounted on a portable terminal of an electronic device, such as a cellular phone or a PDA (Personal Digital Assistant). Such an imaging unit is generally provided with a solid-state image sensor such as a CCD (Charge Coupled Device) image sensor or a CMOS (Complementary Metal-Oxide Semiconductor) image sensor, and a lens group for forming an image in a light receiving area of the solid-state image sensor.

With reduction in size and profile of portable terminals and wide use of the portable terminals, there has been a demand for further reduction in the size and profile of imaging units mounted on the portable terminals while the productivity thereof is also requested. In response to such a request, there has been proposed a technique for mass-producing modules of a lens array laminate in such a manner that a large number of lenses and coupling portions for coupling those lenses with one another are integrally formed out of a photocuring or thermosetting resin material to thereby constitute each lens array, the lens arrays are put into a plurality of layers to form a lens array laminate, and the lens array laminate is divided into a plurality of modules each including a group of lenses arrayed in the laminating direction (see Patent Literature 1 (WO 08/153,102)).

In an imaging unit mounted on a cellular phone or the like, accuracy of alignment of μm order is typically required in a group of lenses. The accuracy of alignment in the group of lenses depends on the pitch accuracy of the lenses in each lens array. In the technique disclosed in Patent Literature 1, for example, an error in pitch among lenses may appear due to influence of variation in light intensity or temperature during curing of a resin material. In addition, an error in pitch among lens forming surfaces of molds for molding the resin material or deformation of a lens array caused by the release of the lens array from the mold may cause the error in pitch among the lenses. Due to a series of such error factors, it has been difficult to suppress the error in pitch among the lenses down to the order of μm in the whole lens array according to the technique disclosed in Patent Literature 1.

To solve the foregoing problem, in a lens array in which a large number of lenses and a coupling portion coupling the lenses with one another are formed integrally, there has been proposed a technique for forming slits in the coupling portion to give flexibility to the coupling portion so that the error in pitch among the lenses can be absorbed by deformation of the coupling portion (see Patent Literature 2 (JP-A-2004-226872)).

SUMMARY OF INVENTION

Only by forming slits in a coupling portion formed integrally out of the same material as lenses, enough flexibility cannot be given to the coupling portion. Thus, there has been a fear that the error in pitch among the lenses cannot be absorbed satisfactorily.

The present invention has been developed in consideration of the aforementioned circumstances. An object of the invention is to provide an element array in which an, error in pitch among elements in the element array can be absorbed surely in a step of laminating a plurality of element arrays so that each group of the elements arrayed in the laminating direction can be aligned with high accuracy.

An element array includes a plurality of elements which are arrayed one-dimensionally or two-dimensionally, and a flexible support which is formed out of a material richer in elasticity than a material forming the elements; in which: the elements are coupled with one another through the support.

According to the invention, a support is formed out of a material richer in elasticity than a material forming elements so that flexibility sufficient enough to absorb an error in pitch among the elements can be secured in the support. Thus, the error in pitch among the elements can be absorbed surely in a step of laminating a plurality of element arrays, so that an element array laminate in which each group of elements arrayed in the laminating direction are aligned with high accuracy can be obtained.

Figure 1:
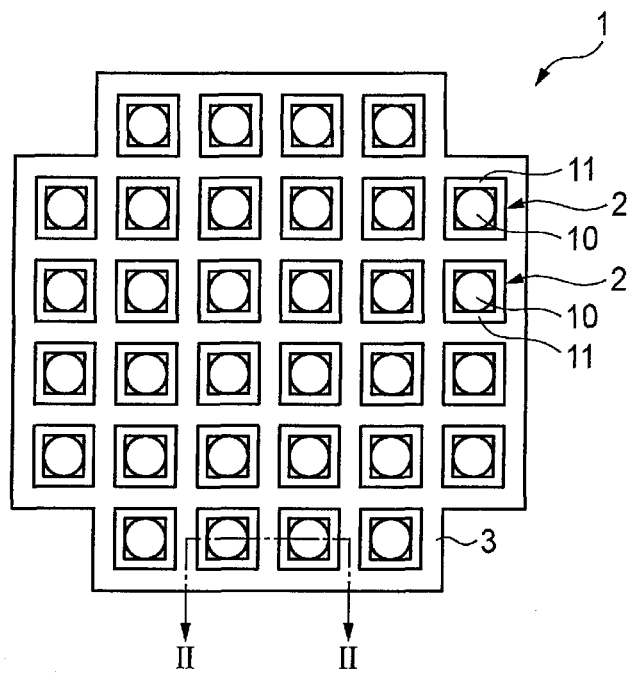
FIG. 1 is a view showing an example of an element array for explaining an embodiment of the invention.

1,1a, 1b lens array (element array)
2 lens (element)
3 support
10 optical function portion
11 flange portion
12 hole
13 fit convex portion
14 fit concave portion
15 pinching portion
16 elastic piece
20 upper mold
21 molding surface
22 lens forming portion
30 lower mold
31 molding surface
32 lens forming portion
40 lens array laminate (element array laminate)
41 lens group
42 bonding agent
43 microscopic sphere
50 element array laminate
51 lens array laminate
52 sensor array
53 lens array
54 lens group
55 imaging unit
60 wafer
61 solid-state image sensor
70 lens
71 substrate portion
101 lens array
103 elastic piece (support)
201 lens array
203 sheet member (support)
204 adhesive sheet
214 hole
301 microchemical chip array laminate (element array laminate)
302a,302b microchemical chip array (element array)
310a,310b microchemical chip (element)
311 elastic piece (support)
312 channel
313 step portion

DESCRIPTION OF EMBODIMENTS

Figure 2:
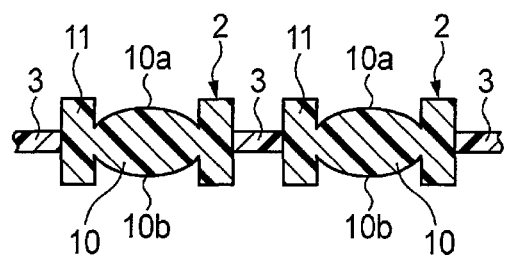
FIG. 2 is a view showing the element array in FIG. 1 by section taken on line II-II.

FIGS. 1 and 2 show an example of an element array. The element array shown in FIGS. 1 and 2 is a lens array.

As shown in FIGS. 1 and 2, a lens array 1 has a plurality of lenses 2 and a support 3.

The lenses 2 are arrayed in a matrix in the illustrated example. The layout of the lenses 2 is not limited to the matrix, but may be a radial or concentrically annular array, another two-dimensional array or a one-dimensional array.

Predetermined optical faces 10a and 10b are formed in the front and back of each lens 2. Although both the optical faces 10a and 10b are convex spherical faces in the illustrated example, various combinations of convex spherical faces, concave spherical faces, aspheric faces or flat faces may be used in accordance of applications.

In addition, each lens 2 has a flange portion 11. The flange portion 11 is formed into a frame-like shape surrounding an outer circumference of an optical function portion 10 put between the optical faces 10a and 10b so that the optical function portion 10 is received in the flange portion 11. Although the outer shape of the flange portion 11 in plan view is rectangular in the illustrated example, the outer shape of the flange portion 11 may be a circle, a polygon or the like.

The support 3 is formed to fill a gap between each lens 2 and other lenses 2 around the lens 2. The support 3 has a net-like (lattice-like) shape as a whole. The support 3 is bonded to circumferential faces of the flange portions 11 of the lenses 2 so as to couple the lenses 2 with one another.

The support 3 is formed out of a material richer in elasticity (richer in stretchability) than the material forming the lenses 2, so that flexibility can be given to the support 3. Thus, the lenses 2 can be displaced in their array directions (row direction and column direction). When the width of each lens 2 is 1, the distance between adjacent two of the lenses 2, that is, the width of the support 3 disposed between those lenses 2 is typically expressed as ¼ to ⅕. It is therefore preferable that the material forming the support 3 is 4 to 5 times as stretchable as the material forming the lenses 2.

The lenses 2 are formed out of a translucent resin composition. For example, an energy-curing resin composition can be suitably used as the resin composition. The energy-curing resin composition may be either a resin composition that can be cured by heat or a resin composition that can be cured by irradiation with active energy rays (e.g. irradiation with ultraviolet rays or electron rays).

It is preferable that the resin composition forming the lenses 2 has moderate fluidity before curing from the point of view of moldability including suitability to transfer the shape of a mold. Specifically, a resin composition which is a liquid at a normal temperature and whose viscosity is about 1,000 to 50,000 mPa·s is preferable.

It is also preferable that the resin composition forming the lenses 2 has enough heat resistance not to be thermally deformed even in a reflow step after curing. In this point of view, the glass transition temperature of the cured composition is preferably not lower than 200° C., more preferably not lower than 250° C., particularly preferably not lower than 300° C. In order to give such a high heat resistance to the resin composition, it is necessary to put molecular-level restraints on the motility of the resin composition. Examples of effective methods include (1) a method for increasing crosslink density per unit volume, (2) a method using resin with a rigid ring structure (such as resin with an alicyclic structure of cyclohexane, norbornane, tetracyclododecane, etc., an aromatic ring structure of benzene, naphthalene, etc., a cardo structure of 9,9-biphenyl fluorene etc., a spiro structure of spirobiindan etc., specifically, resin e.g. disclosed in JP-A-9-137043, JP-A-10-67970, JP-A-2003-55316, JP-A-2007-334018, JP-A-2007-238883, etc.), (3) a method for dispersing high-Tg materials such as inorganic particulates uniformly (e.g. disclosed in JP-A-5-209027, JP-A-10-298265, etc.), and so on. A plurality of these methods may be used together, and preferably adjusted not to spoil other properties including fluidity, shrinkage, refraction, etc.

In addition, it is preferable that the resin composition forming the lenses 2 is a resin composition with a low degree of volume shrinkage due to curing reaction from the point of view of accuracy in shape transfer. The degree of cure shrinkage of the resin composition is preferably not higher than 10%, more preferably not higher than 5%, particularly preferably not higher than 3%. Examples of low-cure-shrinkage resin compositions include (1) a resin composition containing a high-molecular curing agent (prepolymer etc.) (e.g. disclosed in JP-A-2001-19740, JP-A-2004-302293, JP-A-2007-211247, etc., the number average molecular weight of the high-molecular curing agent is preferably in a range of from 200 to 100,000, more preferably in a range of from 500 to 50,000, particularly preferably in a range of from 1,000 to 20,000. In addition, a value obtained by the ratio of the number average molecular weight to the number of curing-reactive groups in the curing agent is preferably in a range of from 50 to 10,000, more preferably in a range of from 100 to 5,000, particularly preferably in a range of from 200 to 3,000), (2) a resin composition containing non-reactive materials (organic/inorganic particulates, non-reactive resin, etc.) (e.g. disclosed in JP-A-6-298883, JP-A-2001-247793, JP-A-2006-225434, etc.), (3) a resin composition containing low-shrinkage crosslink reactive groups (e.g. ring-opening polymerizable groups (e.g. epoxy groups (e.g. disclosed in JP-A-2004-210932 etc.), oxetanyl groups (e.g. disclosed in JP-A-8-134405 etc.), episulfide groups (e.g. disclosed in JP-A-2002-105110 etc.), cyclic carbonate groups (e.g. disclosed in JP-A-7-62065 etc.), thiol-ene curing groups (e.g. disclosed in JP-A-2003-20334 etc.), hydrosilylated curing groups (e.g. JP-A-2005-15666 etc.), etc.) (4) a resin composition containing rigid backbone resin (fluorene, adamantane, isophorone or the like) (e.g. disclosed in JP-A-9-137043 etc.), (5) a resin composition containing two kinds of monomers having different polymerizable groups with an interpenetrating polymer network structure (so-called IPN structure) formed therebetween (e.g. disclosed in JP-A-2006-131868 etc.), (6) a resin composition containing an expansive material (e.g. disclosed in JP-A-2004-2719, JP-A-2008-238417, etc.), etc. Those resin compositions (1) to (6) can be suitably used in the invention. In addition, it is preferable to use a plurality of the aforementioned methods for reducing shrinkage caused by curing (e.g. a resin composition which contains prepolymer and particulates containing ring-opening polymerizable groups etc.) in view from optimization of physical properties.

In addition, a mixture of resins having at least two different kinds of high and low Abbe numbers is desirable as the resin composition forming the lenses 2. The Abbe number (vd) of the high Abbe-number resin is preferably not lower than 50, more preferably not lower than 55, particularly preferably not lower than 60. The refractive index (nd) is preferably not lower than 1.52, more preferably not lower than 1.55, particularly preferably not lower than 1.57. Preferable examples of such resins include aliphatic resins. Of them, particularly a resin having an alicyclic structure (e.g. resin having a ring structure such as cyclohexane, norbornane, adamantane, tricyclodecane, tetracyclodecane, etc., and specifically, resin e.g. disclosed in JP-A-10-152551, JP-A-2002-212500, JP-A-2003-20334, JP-A-2004-210932, JP-A-2006-199790, JP-A-2007-2144, JP-A-2007-284650, JP-A-2008-105999, etc.) is preferable. The Abbe number (vd) of the low Abbe-number resin is preferably not higher than 30, more preferably not higher than 25, particularly preferably not higher than 20. The refractive index (nd) is preferably not lower than 1.60, more preferably not lower than 1.63, particularly preferably not lower than 1.65. Resin having an aromatic structure is preferable as such a resin. For example, resin containing a structure of 9,9'-diarylfluorene, naphthalene, benzothiazole, benzotriazole, or the like (specifically, resin etc. e.g. disclosed in JP-A-60-38411, JP-A-10-67977, JP-A-2002-47335, JP-A-2003-238884, JP-A-2004-83855, JP-A-2005-325331, JP-A-2007-238883, WO 2006/095610, Japanese Patent No. 2537540, etc.) is preferable.

In addition, it is preferable that inorganic particulates are dispersed into the matrix in the resin composition forming the lenses 2 in order to enhance the refractive index or adjust the Abbe number. Examples of the inorganic particulates include oxide particulates, sulfide particulates, selenide particulates, and telluride particulates. More specifically, those examples include particulates of zirconium oxide, titanium oxide, zinc oxide, tin oxide, niobium oxide, cerium oxide, aluminum oxide, lanthanum oxide, yttrium oxide, zinc sulfide, etc. Particularly in the aforementioned high Abbe-number resin, it is preferable that particulates of lanthanum oxide, aluminum oxide, zirconium oxide, etc. are dispersed. In the low Abbe-number resin, it is preferable that particulates of titanium oxide, tin oxide, zirconium oxide etc. are dispersed. One kind of inorganic particulates may be used alone or two or more kinds of inorganic particulates may be used together. In addition, the inorganic particulates may be a composite of a plurality of components. In addition, for the sake of various objects such as reduction in photo-catalytic activity or reduction in water absorption, the inorganic particulates may be doped with a different kind of metal, the surface layer of the inorganic particulates may be coated with oxide of a different kind of metal such as silica or alumina, or the surface of the inorganic particulates may be modified with a silane coupling agent, a titanate coupling agent, a dispersing agent containing organic acid (carboxylic acids, sulfonic acids, phosphoric acids, phosphonic acids, etc.) or an organic acid group, etc. The number average particle size of the inorganic particulates may be normally set at about 1 nm to 1,000 nm. When the particle size is too small, the physical properties may change. When the particle size is too large, the influence of Rayleigh scattering may become conspicuous. Therefore, the particle size is preferably in a range of from 1 nm to 15 nm, more preferably in a range of from 2 nm to 10 nm, particularly preferably in a range of from 3 nm to 7 nm. In addition, it is desirable that the particle size distribution of the inorganic particulates is narrower. Such monodisperse particles may be defined in various ways. For example, a numeric range defined as disclosed in JP-A-2006-160992 is applied to the preferable particle size distribution range. Here, the aforementioned number average primary particle size can be measured, for example, by an X-ray diffraction (XRD) device, a transmission electron microscope (TEM) or the like. The refractive index of the inorganic particulates at 22° C. and in a wavelength of 589 nm is preferably in a range of from 1.90 to 3.00, further preferably in a range of from 1.90 to 2.70, particularly preferably in a range of from 2.00 to 2.70. The content of the inorganic particulates relative to the resin is preferably not lower than 5% by mass, more preferably in a range of from 10% to 70% by mass, particularly preferably in a range of from 30% to 60% by mass, from the point of view of transparency and higher refractive index.

To disperse the particulates into the resin composition uniformly, it is desirable to disperse the particulates suitably by use of, for example, a dispersing agent containing functional groups with reactivity to resin monomers forming the matrix (e.g. disclosed in Example of JP-A-2007-238884 etc.), block copolymer constituted by a hydrophobic segment and a hydrophilic segment (e.g. disclosed in JP-A-2007-211164), resin containing functional groups capable of forming a desired chemical bond with the inorganic particulates at a terminal or a side chain of polymer (e.g. disclosed in JP-A-2007-238929, JP-A-2007-238930, etc.), or the like.

In addition, additives including a well-known mold release agent such as a silicon-based agent, a fluorinated agent or a long-chain alkyl-group containing compound, an antioxidant such as hindered phenol, etc. may be suitably blended with the resin composition forming the lenses 2.

In addition, a curing catalyst or initiator may be blended with the resin composition forming the lenses 2 if necessary. Specifically, a compound for accelerating curing reaction (radical polymerization or ionic polymerization) due to action of heat or active energy rays, for example, disclosed in JP-A-2005-92099 (paragraph numbers [0063] to [0070]) or the like may be used. The additive amounts of these curing reaction accelerating agents vary depending on the kind of catalyst or initiator or difference in the curing-reactive portion thereof. Therefore, the additive amounts cannot be defined categorically, but generally preferably about 0.1% to 15% by mass, more preferably about 0.5% to 5% by mass, relative to the total solid of the curing-reactive resin composition.

The resin composition forming the lenses 2 can be manufactured by suitably blending the aforementioned components. On this occasion, a solvent does not have to be added separately when low molecular weight monomer (reactive diluent) etc. in a liquid state can dissolve the other components. Otherwise the curing resin composition can be manufactured by dissolving each constituent component by use of a solvent. The solvent which can be used in the curing resin composition is not limited particularly but can be selected suitably as long as the composition can be dissolved or dispersed uniformly without being precipitated. Specifically, examples of such solvents include ketones (e.g. acetone, methyl ethyl ketone, methyl isobutyl ketone, etc.), esters (e.g. ethyl acetate, butyl acetate, etc.), ethers (e.g. tetrahydrofuran, 1,4-dioxane, etc.), alcohols (e.g. methanol, ethanol, isopropyl alcohol, butanol, ethylene glycol, etc.), aromatic hydrocarbons (e.g. toluene, xylene, etc.), water, etc. When the curing composition contains a solvent, it is preferable that the transfer operation of a mold shape is performed after the solvent is dried.

The material forming the support 3 is not limited particularly as long as it is a material richer in elasticity than the aforementioned material forming the lenses 2. For example, a material in which a filler of a heat-resistant raw material such as silica or polyimide is kneaded in an olefin-based resin may be used.

FIGS. 3A-3D show an example of a method for manufacturing the aforementioned lens array 1. In the example shown in FIGS. 3A-3D, the lenses 2 and the support 3 are formed integrally by double molding.

First, a forming mold will be described. The forming mold has an upper mold 20 and a lower mold 30. In a molding surface 21 of the upper mold 20, a plurality of lens forming portions 22 are arranged like a matrix in the same layout as the arrangement of the lenses 2 in the lens array 1. The lens forming portions 22 form front surface shapes of the lenses 2. In a molding surface 31 of the lower mold 30, a plurality of lens forming portions 32 are arranged like a matrix in the same layout as the arrangement of the lenses 2 in the lens array 1. The lens forming portions 32 form back surface shapes of the lenses 2.

The material of the molds 20 and 30 is selected suitably in accordance with the energy-curing resin material forming the lenses 2 or the support 3. When thermosetting resin is used as the resin material, for example, a metal material superior in coefficient of thermal conductivity or a material capable of transmitting infrared rays may be used as the material of the molds. On the other hand, when ultraviolet-curing resin is used as the resin material, for example, a material capable of transmitting ultraviolet rays is used as the material of the molds. When resin curable by electron rays is used as the resin material, a material capable of transmitting the electron rays is used as the material of the molds.

Figure 3A:
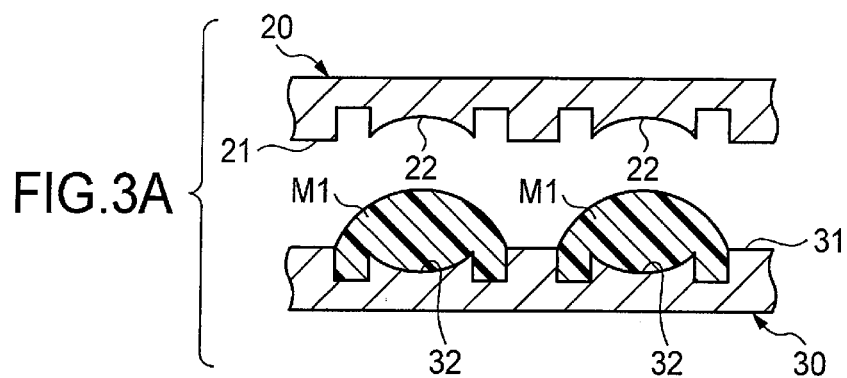
FIGS. 3A to 3D are views showing an example of a method for manufacturing the element array in FIG. 1.

As shown in FIG. 3A, a resin material M1 forming the lenses 2 is dripped to each lens forming portion 32 of the lower mold 30.

Figure 3B:
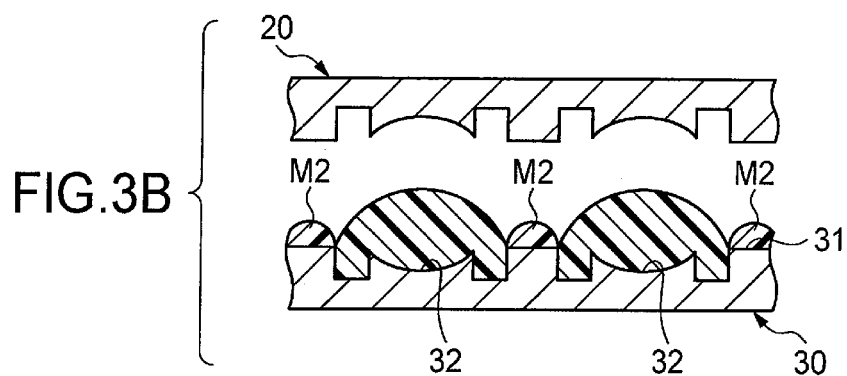

Next, as shown in FIG. 3B, a resin material M2 forming the support 3 is supplied onto the molding surface 31 of the lower mold 30 excluding the lens forming portions 32.

Figure 3C:
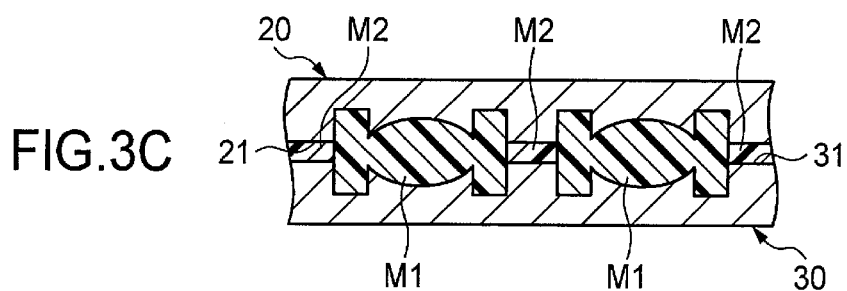

Next, as shown in FIG. 3C, the upper mold 20 is moved down to compress the resin materials M1 and M2 between the molding surface 21 of the upper mold 20 and the molding surface 31 of the lower mold 30. Thus, the resin materials M1 and M2 are deformed in accordance with the molding surfaces 21 and 31.

Figure 3D:
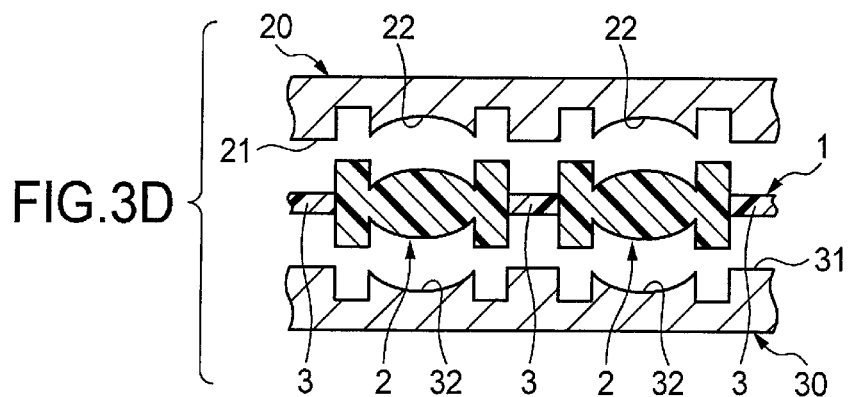

Next, as shown in FIG. 3D, energy is applied to the resin materials M1 and M2 to cure the resin materials M1 and M2 and obtain the lens array 1. The lenses 2 are formed between the paired lens forming portions 22 and 32 respectively. In addition, the support 3 is formed between the molding surfaces 21 and 31 excluding the lens forming portions 22 and 32. The lenses 2 and the support 3 are formed integrally in the state where they are bonded with each other.

In the aforementioned example, the lenses 2 and the support 3 are formed by casting and compression of the resin materials respectively, but they are not limited to this method. For example, the lenses 2 may be formed by casting and compression while the support 3 is formed by injection of the resin material into a cavity in the state where the forming molds are closed for forming the lenses 2. Alternatively, the lenses 2 produced individually in advance may be inserted while the support 3 is formed by casting and compression or injection. In any case, it is preferable that formation of the lenses 2 and the support 3 is performed under a vacuum environment in order to prevent bubbles from being mixed into the lenses 2 or the support 3.

Figure 4:
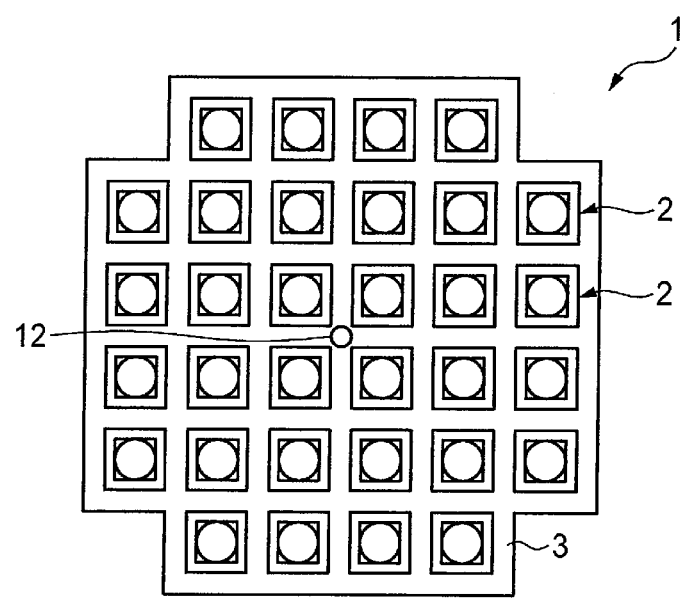
FIG. 4 is a view showing a modification of the element array in FIG. 1.

FIG. 4 shows a modification of the aforementioned lens array 1.

In the lens array 1 shown in FIG. 4, a hole 12 is formed to penetrate the support 3 in its thickness direction. In the illustrated example, a single hole 12 is provided in a center portion of the support 3, but the number of holes 12 and the positions thereof are not limited. For example, a plurality of holes 12 may be provided and distributed all over the support 3.

FIGS. 5A to 5D show an example of a method for manufacturing the lens array 1 shown in FIG. 4. In the example shown in FIGS. 5A to 5D, the lenses 2 and the support 3 are formed integrally by double molding.

First, a forming mold will be described. The forming mold has an upper mold 20 and a lower mold 30. A convex portion 33 is provided in a center portion of a molding surface 31 of the lower mold 30. The convex portion 33 protrudes from the molding surface 31 so as to be as high as the thickness of the support 3 in the lens array 1. The convex portion 33 abuts against a molding surface 21 of the upper mold 20 when the upper mold 20 and the lower mold 30 are closed.

Figure 5A:
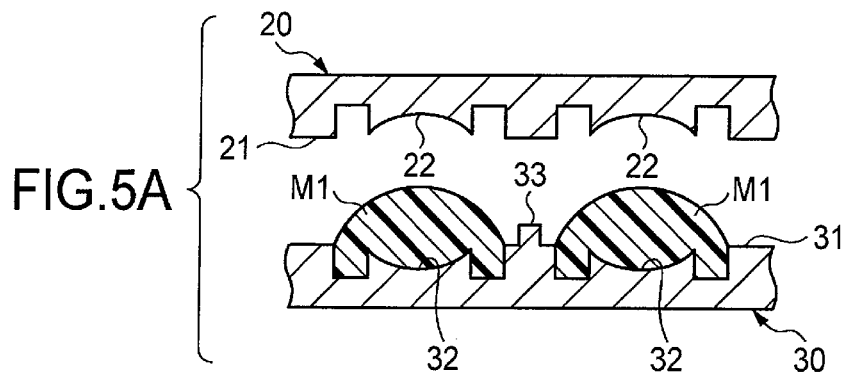
FIGS. 5A to 5D are views showing an example of a method for manufacturing the element array in FIG. 4.

As shown in FIG. 5A, a resin material M1 forming the lenses 2 is dripped to each lens forming portion 32 of the lower mold 30.

Figure 5B:
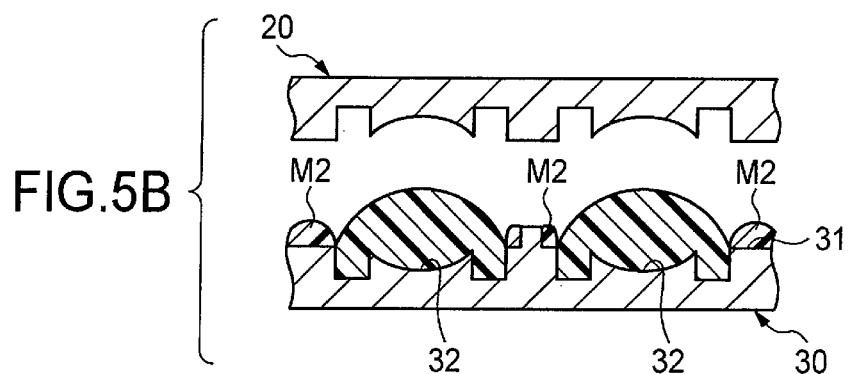

Next, as shown in FIG. 5B, a resin material M2 forming the support 3 is supplied onto the molding surface 31 of the lower mold 30 excluding the lens forming portions 32.

Figure 5C:
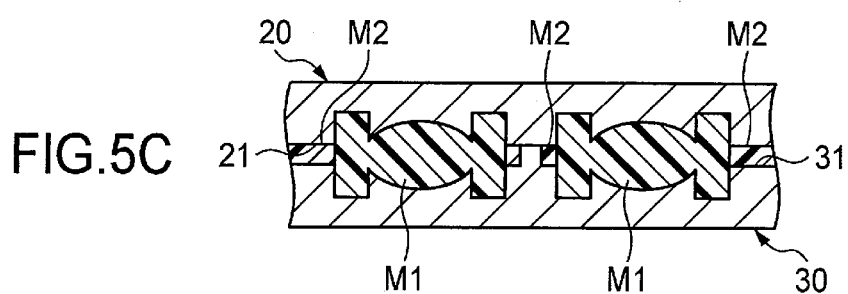

Next, as shown in FIG. 5C, the upper mold 20 is moved down to compress the resin materials M1 and M2 between the molding surface 21 of the upper mold 20 and the molding surface 31 of the lower mold 30. Thus, the resin materials M1 and M2 are deformed in accordance with the molding surfaces 21 and 31.

Figure 5D:
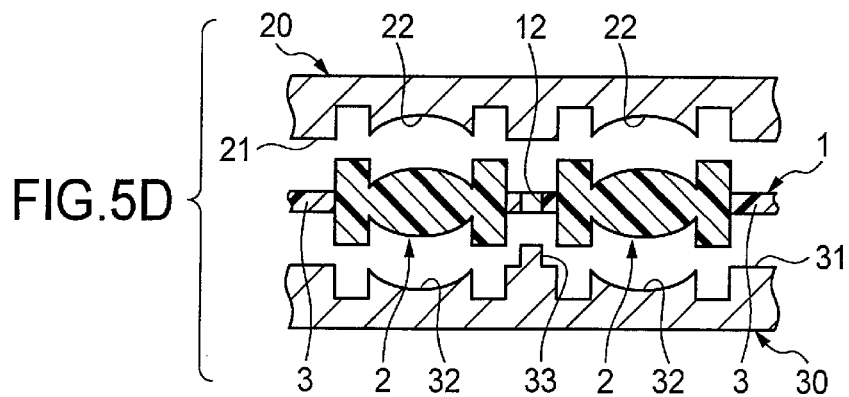

Next, as shown in FIG. 5D, energy is applied to the resin materials M1 and M2 to cure the resin materials M1 and M2 and obtain the lens array 1. The lenses 2 are formed between the paired lens forming portions 22 and 32 respectively. In addition, the support 3 is formed between the molding surfaces 21 and 31 excluding the lens forming portions 22 and 32 and the convex portion 33. The lenses 2 and the support 3 are formed integrally in the state where they are bonded with each other. In the center portion of the support 3, a hole 12 penetrating the support 3 in its thickness direction is formed by the convex portion 33 of the lower mold 30.

In this manner, the convex portion 33 abutting against the molding surface 21 of the upper mold 20 is provided in the molding surface 31 of the lower mold 30 so that the hole 12 penetrating the support 3 in its thickness direction can be formed in the support 3 by molding the resin material. When the convex portion 33 is brought into abutment against the molding surface 21 of the upper mold 20, the distance between the molding surface 21 of the upper mold 20 and the molding surface 31 of the lower mold 30 in the periphery of the convex portion 33 can be defined uniquely.

Distortion may appear in a forming mold due to a load etc. imposed on the forming mold when resin materials are compressed. Particularly a lens array for mass-producing lens groups of imaging units to be mounted on cellular phones or the like has a wafer-like shape (disc-like shape) whose diameter is, for example, 6 inches, 8 inches or 12 inches as a whole. A forming mold for forming the lens array typically has a comparatively large area of a molding surface relative to the thickness thereof. Thus, distortion may appear in the forming mold easily. The distortion in the forming mold leads to a variation in distance between molding surfaces to produce an error in thickness among lenses.

In the aforementioned manner, the convex portion 33 is brought into abutment against the molding surface 21 of the upper mold 20 to uniquely define the distance between the molding surface 21 of the upper mold 20 and the molding surface 31 of the lower mold 30 in the periphery of the convex portion 33. The accuracy of the thickness of each lens 2 formed thus can be enhanced to obtain desired optical performance in the lens 2. Preferably, a plurality of convex portions 33 are provided and distributed all over the molding surface 31. That is, a plurality of holes 12 are provided in the support 3 so as to be distributed all over the support 3.

Figure 6:
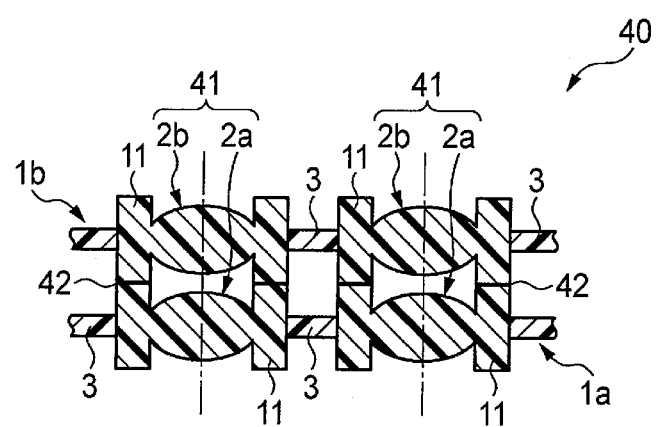
FIG. 6 is a view showing an example of an element array laminate for explaining the embodiment of the invention.

FIG. 6 shows an example of an element array laminate. The element array laminate shown in FIG. 6 is a lens array laminate in which a plurality of lens arrays 1 in FIG. 1 are laminated on one another.

As shown in FIG. 6, a lens array laminate 40 is formed by laminating two lens arrays 1a and 1b on each other. Each lens array 1a, 1b has a similar configuration to that of the lens array 1 in FIG. 1.

A lens group 41 is constituted by a lens 2a belonging to the lens array 1a and a lens 2b belonging to the lens array 2b, which are arrayed in the laminating direction of the lens arrays 1a and 1b. The lenses 2a and 2b constituting the lens group 41 are bonded to align their optical axes with each other. The lenses 2a and 2b constituting the lens group 41 are bonded by a bonding agent 42 applied to a flange portion 11 of either of the lenses 2a and 2b or flange portions 11 of both the lenses 2a and 2b.

Figure 7A:
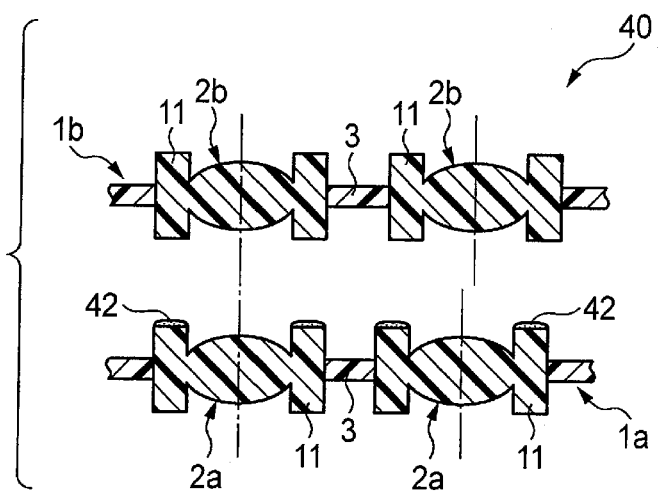
FIG. 7A is a view showing a state where a plurality of element arrays forming the element array laminate in FIG. 6 have not yet been laminated.

FIG. 7A shows a state where the lens arrays 1a and 1b have not yet been laminated. FIG. 7A shows a case where misalignment appears between the pitch of lenses 2a in the lens array 1a and the pitch of lenses 2b in the lens array 1b. Hence, misalignment also appears between the optical axes of the lenses 2a and 2b constituting the lens group 41.

Figure 7B:
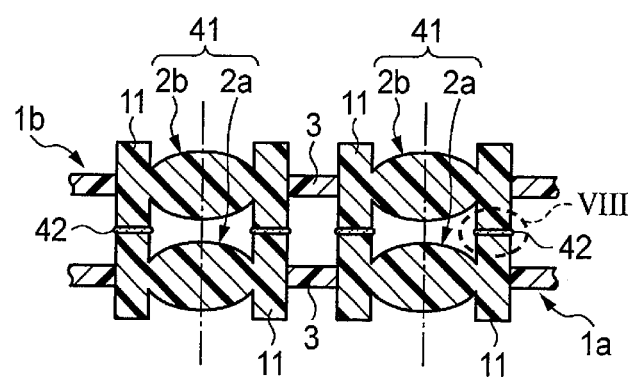
FIG. 7B is a view showing a state where the element arrays have been laminated to form the element array laminate.

As shown in FIG. 7B, as the lens arrays 1a and 1b are laminated, the bonding agent 42 is put between the flange portions 11 of the lenses 2a and 2b constituting the lens group 41. Due to the self-alignment effect caused by the surface tension of the bonding agent 42, one lens 2a is moved relatively to the other lens 2b in the pitch direction while suitably expanding/contracting the support 3 belonging to the lens array 1a and the support 3 belonging to the lens array 1b. Thus, the lenses 2a and 2b are aligned with each other. When the bonding agent 42 is cured in that state, the lenses 2a and 2b are bonded in the state where their optical axes are aligned with each other.

In the example shown in FIG. 7B, the self-alignment effect of the bonding agent 42 is expressed by the edge (macroscopic shape) of the bonding face of each flange portion 11. Alternatively, the self-alignment effect of the bonding agent 42 may be expressed by adjusting the surface texture (microscopic shape) of the bonding face of each flange portion 11 or depositing a film on the bonding face to thereby pattern wettability with the bonding agent 42 on the bonding face.

Figure 8:
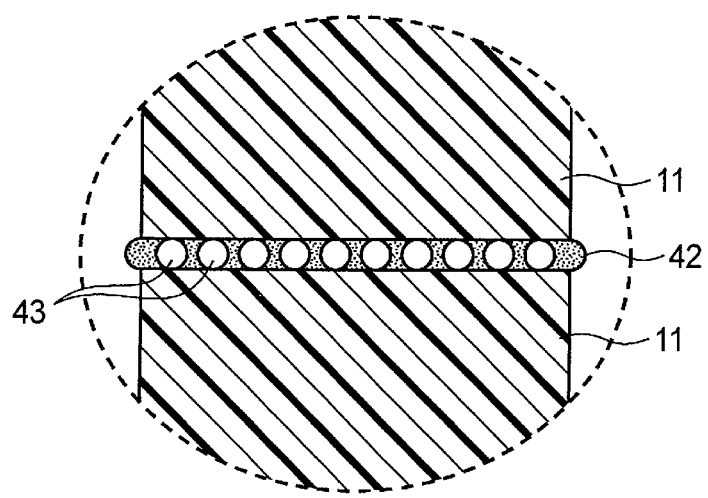
FIG. 8 is an enlarged view of a portion surrounded by a dotted circle VIII in the element array laminate in FIG. 7B.

The bonding agent 42 is typically contracted as it is cured. In some case, it is considered that a variation in height may appear among the lens groups 41 due to the thickness of the bonding agent 42 which has been cured. Therefore, as shown in FIG. 8, microscopic spheres 43 which are uniform in particle size may be mixed into the bonding agent 42. When the distance between the bonding surfaces is defined by the diameter of the microscopic spheres 43, the variation in height among the lens groups 41 can be suppressed.

Figure 9:
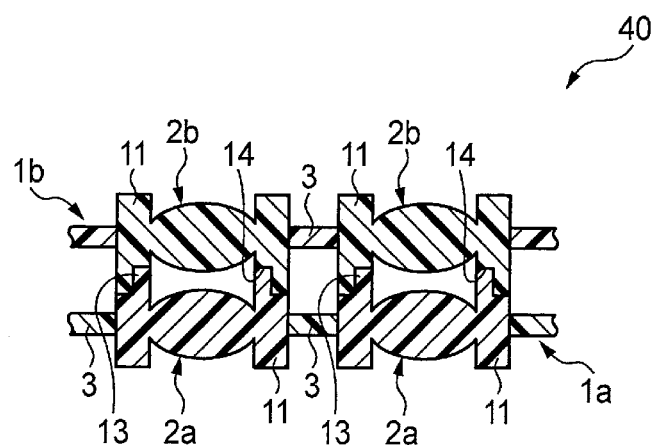
FIG. 9 is a view showing a modification of the element array in FIG. 1, and a laminate thereof.

FIG. 9 shows another modification of the lens array 1 in FIG. 1, and a laminate thereof.

In a lens array laminate 40 shown in FIG. 9, a fit convex portion 13 is provided in a flange portion 11 of each lens 2a belonging to a lens array 1a, while a fit concave portion 14 to which the fit convex portion 13 is fitted is provided in a flange portion 11 of each lens 2b belonging to a lens array 1b.

When the fit convex portion 13 and the fit concave portion 14 are fitted to each other, the lenses 2a and 2b are aligned with each other. Thus, the lenses 2a and 2b are bonded in the state where their optical axes are aligned. Concurrently, relatively to one lens 2a, the other lens 2b can be positioned in the laminating direction when the fit concave portion 14 is brought into abutment against the fit convex portion 13. Thus, the variation in height among the lens groups 41 can be suppressed.

Figure 10:
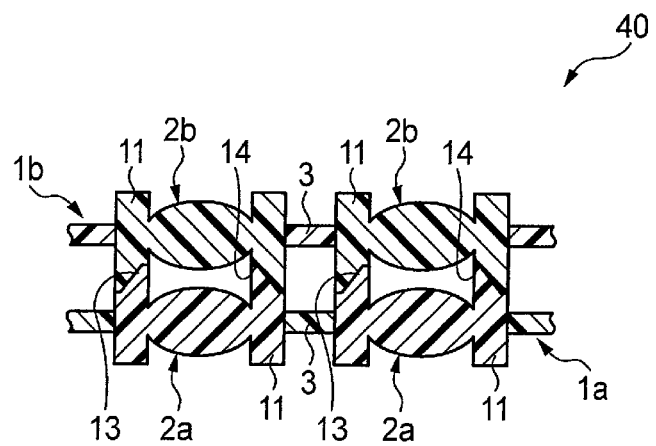
FIG. 10 is a view showing another modification of the element array in FIG. 1, and a laminate thereof.

FIG. 10 shows another modification of the lens array 1 in FIG. 1, and a laminate thereof.

In a lens array laminate 40 shown in FIG. 10, a fitting face of a fit convex portion 13 provided in a flange portion 11 of each lens 2a belonging to a lens array 1a and a fitting face of a fit concave portion 14 provided in a flange portion 11 of each lens 2b belonging to a lens array 1b are formed into tapered faces which can be mated with each other.

When the fit convex portion 13 and the fit concave portion 14 are fit to each other, the lenses 2a and 2b are aligned with each other so that the lenses 2a and 2b can be bonded in the state where their optical axes are aligned. Concurrently, relatively to one lens 2a, the other lens 2b can be positioned in the laminating direction when the fit concave portion 14 is brought into abutment against the fit convex portion 13. Thus, a variation in height among the lens groups 41 can be suppressed. Further, since the fitting faces of the fit convex portion 13 and the fit concave portion 14 are tapered faces, the both can be fitted to each other smoothly.

Figure 11:
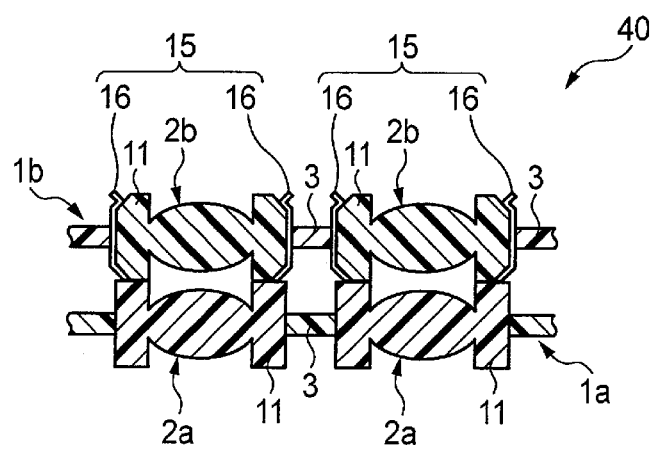
FIG. 11 is a view showing another modification of the element array in FIG. 1, and a laminate thereof.

FIG. 11 shows another modification of the lens array 1 in FIG. 1, and a laminate thereof.

In a lens array laminate 40 shown in FIG. 11, pinching portions 15 for elastically pinching lenses 2b belonging to a lens array 1b are provided in flange portions 11 of lenses 2a belonging to a lens array 1a so as to be arranged in the array direction of the lenses 2a in the lens array 1a.

Each pinching portion 15 is constituted by a pair of elastic pieces 16 opposed to each other in a row direction which is the array direction of the lenses 2a in the lens array 1a and a pair of elastic pieces 16 opposed to each other in a column direction (only the pair of elastic pieces 16 opposed in the row direction are shown in FIG. 11). Holes through which the elastic pieces 16 can be inserted are suitably formed in a support 3 belonging to the lens array 1b.

The elastic pieces 16 are formed out of a material more elastic than the material forming the support 3. The elastic pieces 16 are formed integrally with the lenses 2a, for example, by insert molding. As the pair of elastic pieces 16 opposed in the row direction and the pair of elastic pieces 16 opposed in the column direction pinch the lenses 2b elastically in the row direction and the column direction, the support 3 belonging to the lens array 1a and the support 3 belonging to the lens array 1b are expanded/contracted in the row direction and the column direction respectively so that the lenses 2a and 2b can be aligned with each other. Further, front end portions of the elastic pieces 16 can be engaged with front edge portions of the flange portions 11 of the lenses 2b so that the lenses 2a and 2b can be locked in the state where their optical axes are aligned with each other.

In each of the aforementioned examples of element array laminates, a plurality of lens arrays 1 in FIG. 1 (or lens arrays according to a modification thereof) are laminated. However, the lens array 1 in FIG. 1 may be laminated on another element array to form an element array laminate.

Figure 12:
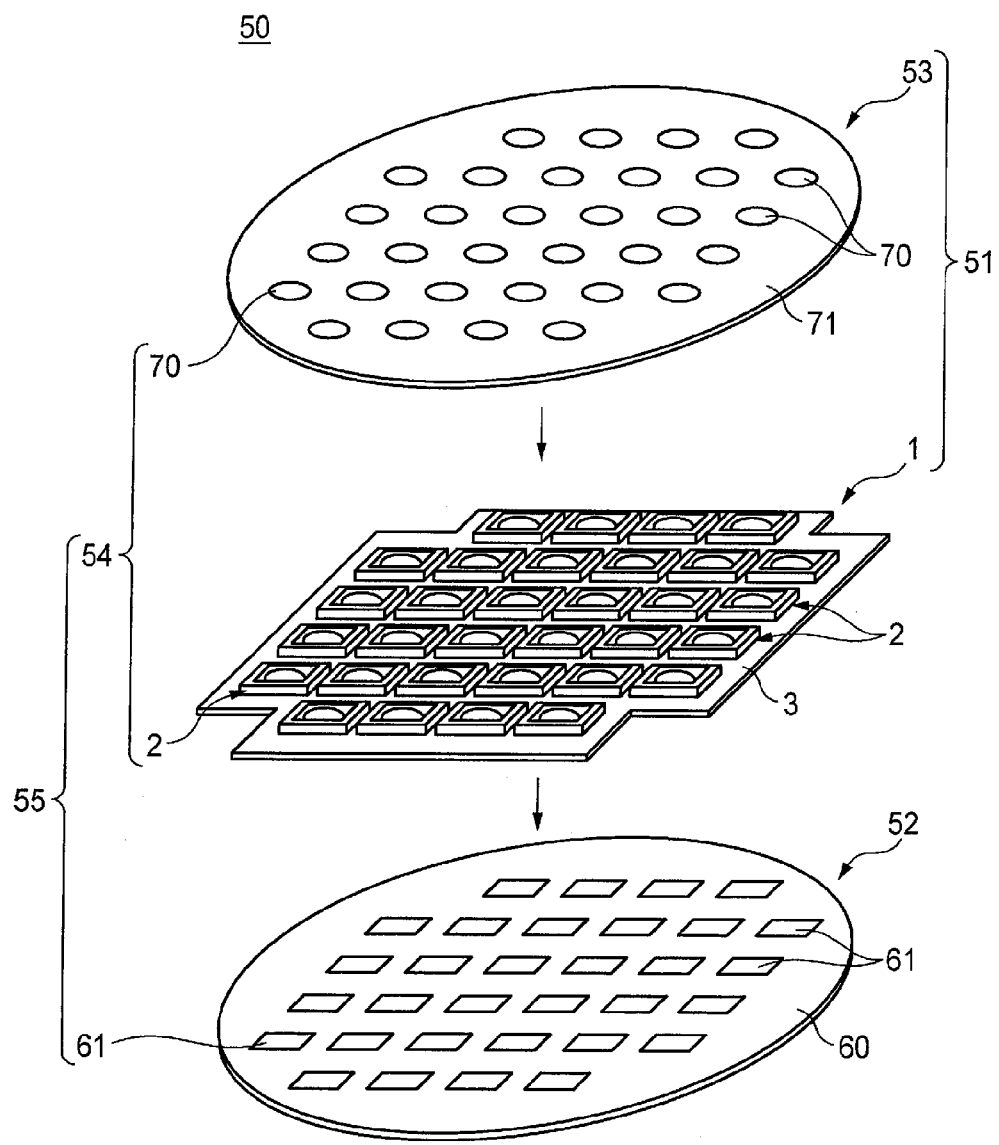
FIG. 12 is a view showing another example of an element array laminate for explaining the embodiment of the invention.

FIG. 12 shows another example of an element array laminate.

As shown in FIG. 12, an element array laminate 50 is constituted by the lens array 1 in FIG. 1 and a lens array 53 laminated sequentially on a sensor array 52.

The sensor array 52 has a wafer 60 formed out of a semiconductor material such as silicon. A plurality of solid-state image sensors 61 are formed on the wafer 60. The solid-state image sensors 61 are, for example, CCD image sensors, CMOS image sensors, or the like, which are formed as follows. That is, a film forming step, a photolithographic step, an etching step, an impurities adding step, etc. as known well are performed on the wafer 60 repeatedly to form light receiving regions, an insulating film, electrodes, wiring, etc. on the wafer 60.

The lens array 53 has a plurality of lenses 70 and a substrate portion 71 coupling the lenses 70 with one another. The lenses 70 and the substrate portion 71 are formed integrally out of a translucent resin composition. The substrate portion 71 is formed into a wafer-like shape having the same size as the wafer 60 of the sensor array 52. For example, the same resin composition as the resin composition forming the lenses 2 in the lens array 1 may be used as the resin composition forming the lenses 70 and the substrate portion 71. Accordingly, the substrate portion 71 is higher in rigidity than the support 3 in the lens array 1, but the lenses 70 in the lens array 53 are not coupled flexibly.

The layout of the solid-state image sensors 61 in the sensor array 52 and the layout of the lenses 70 in the lens array 53 are arranged in the same manner as the layout of the lenses 2 in the lens array 1. A lens group 54 is constituted by a lens 2 and a lens 70 arrayed in the laminating direction. One imaging unit 55 is constituted by the lens group 54 and a solid-state image sensor 61.

To laminate the lens array 1, the sensor array 52 and the lens array 53 to form the element array laminate 50, the lens array 1 and the lens array 53 are first laminated to obtain a lens array laminate 51. On that occasion, the support 3 belonging to the lens array 1 is expanded/contracted suitably so that the lenses 2 and the lenses 70 forming the lens groups 54 can be aligned with each other. The aforementioned self-alignment of the bonding agent 42 (see FIGS. 7A and 7B), the fit convex portion 13 and the fit concave portion 14 (see FIGS. 9 and 10) or the pinching portion 15 (see FIG. 11) may be used suitably as an alignment portion between each lens 2 and each lens 70.

Next, the lens array laminate 51 is laminated on the sensor array 52. The accuracy required for the alignment between each lens group 54 and each solid-state image sensor 61 is comparatively lower than the accuracy required for the alignment between each lens 2 and each lens 70 constituting each lens group 54. Since the layout of the solid-state image sensors 61 in the sensor array 52 is arranged in the same manner as the layout of the lens groups 54 in the lens array laminate 51, a plurality of imaging units 55 can be formed in a lump when the lens array laminate 51 is laminated on the sensor array 52.

Figure 13:
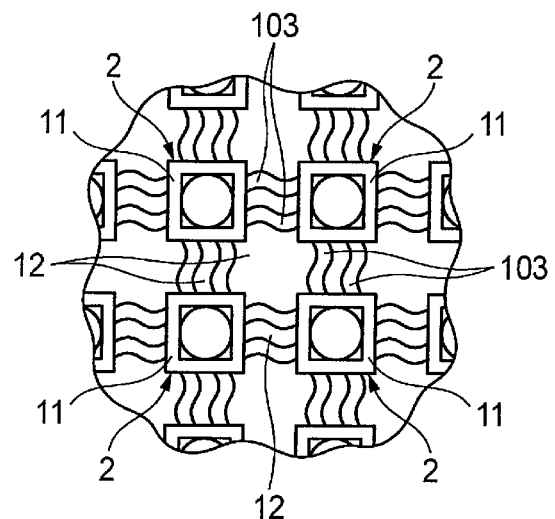
FIG. 13 is a view showing another example of an element array for explaining the embodiment of the invention.

FIG. 13 shows another example of an element array. The element array shown in FIG. 13 is a lens array. Members common to the aforementioned lens array 1 are given common reference signs correspondingly, so that description thereof will be omitted or simplified.

As shown in FIG. 13, a lens array 101 has a plurality of lenses 2 and a plurality of elastic pieces 103 serving as a support.

The lenses 2 are arrayed like a matrix.

The elastic pieces 103 are provided between adjacent ones of the lenses 2 respectively. In the illustrated example, two elastic pieces 103 are provided between the lenses 2 adjacent to each other. However, one may be provided likewise, or three or more may be provided likewise. The gap between each lens 2 and lenses 2 around the lens 2 is segmented by the elastic pieces 103 provided in the gap so as to form a plurality of holes 12.

End portions of each elastic piece 103 are bonded to opposed surfaces of two flange portions 11 of two lenses 2 between which the elastic piece 103 is placed, so that the elastic piece 103 can couple the two lenses 2 with each other.

The elastic pieces 103 are formed out of a material richer in elasticity (richer in stretchability) than the material forming the lenses 2, so that flexibility can be given to the elastic pieces 103. Further, each elastic piece 103 is formed meandering with respect to a straight line connecting the places where the elastic piece 103 is bonded with the flange portions 11 of two lenses 2 to be coupled. Due to such a shape, flexibility can be further provided. That is, each elastic piece 103 can be deformed from a meandering shape to a straight shape or from a straight shape to a meandering shape so as to displace the lenses 2 in their array directions (row direction and column direction).

The lens array 101 may be manufactured in the same manufacturing method as the lens array 1 shown in FIGS. 5A-5D. Refer to FIGS. 5A-5D. In the molding surface 31 of the lower mold 30, the convex portions 33 are provided in positions corresponding to the holes 12 respectively. The resin material for forming the lenses 2 and the resin material for forming the elastic pieces 103 are cast, compressed, and cured to obtain the lens array 101. Each lens 2 is formed between a pair of lens forming portions 22 and 32. In addition, the elastic pieces 103 are formed between the molding surfaces 21 and 31 excluding the lens forming portions 22 and 32 and the convex portions 33. The lenses 2 and the elastic pieces 103 are formed integrally in the state where they are bonded with each other.

Also in the aforementioned method for manufacturing the lens array 101, the convex portions 33 for forming the holes 12 are provided in the molding surface 31 of the lower mold 30. When the convex portions 33 are brought into abutment against the molding surface 21 of the upper mold 20, the distance between the molding surface 21 of the upper mold 20 and the molding surface 31 of the lower mold 30 in the periphery of each convex portion 33 can be defined uniquely. The accuracy of the thickness of each lens 2 formed thus can be enhanced to obtain desired optical performance in the lens 2.

The aforementioned self-alignment of the bonding agent 42 (see FIGS. 7A and 7B), the fit convex portion 13 and the fit concave portion 14 (see FIGS. 9 and 10) or the pinching portion 15 (see FIG. 11) may be used suitably as an alignment portion between each lens 2 belonging to the lens array 101 and each element belonging to another element array which are arrayed in the laminating direction when the lens array 101 and the other element array are laminated.

Figure 14:
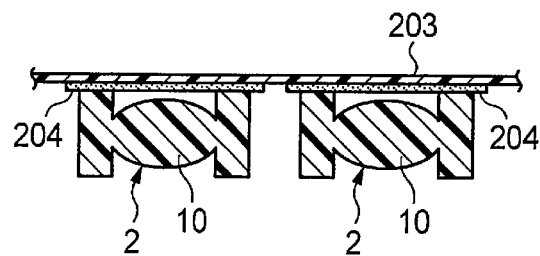
FIG. 14 is a view showing another example of an element array for explaining the embodiment of the invention.

FIG. 14 shows another example of an element array. The element array shown in FIG. 14 is a lens array. Members common to the aforementioned lens array 1 are given common reference signs correspondingly, so that description thereof will be omitted or simplified.

As shown in FIG. 14, a lens array 201 has a plurality of lenses 2 and a sheet member 203 serving as a support.

The lenses 2 are arrayed like a matrix. Flange portions 11 of the lenses 2 are removably bonded to one surface of the sheet member 203 through a removable adhesive sheet 204 so that the lenses 2 are coupled with one another by the sheet member 203. It is preferably that the adhesive sheet 204 for bonding the lens 2 with the sheet member 203 can be easily removed by heating or irradiation with ultraviolet rays.

The sheet member 203 is formed out of a material richer in elasticity (richer in stretchability) than the material forming the lenses 2, so that flexibility can be given to the sheet member 203. Thus, the lenses 2 can be displaced in their array directions (row direction and column direction).

Figure 15A:
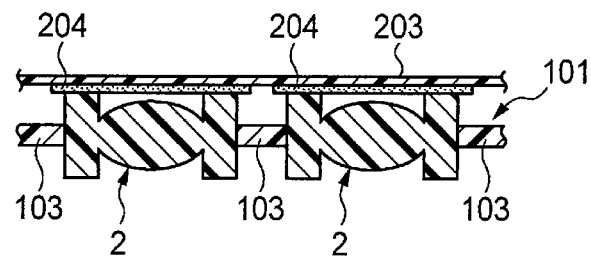
FIGS. 15A and 15B are views showing an example of a method for manufacturing the element array in FIG. 14.
Figure 15B:
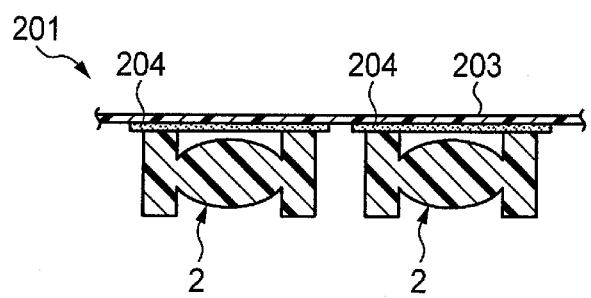

FIG. 15A and FIG. 15B show an example of a method for manufacturing the lens array 201 in FIG. 14.

As shown in FIG. 15A, for the aforementioned lens array 201, for example, the lens array 101 shown in FIG. 6 is prepared, and the lenses 2 belonging thereto are bonded to the sheet member 203 through the adhesive sheet 204 in a lump.

Next, as shown in FIG. 15B, the elastic pieces 103 of the lens array 101 are cut to separate the lenses 2 individually and obtain the lens array 201.

Incidentally, in the lens array 201, the lenses 2 are coupled flexibly through the sheet member 203. Although the aforementioned example has been described on the assumption that the lens array 101 shown in FIG. 6 is used, whether or not the lenses 2 are coupled flexibly in the lens array to be bonded to the sheet member 203 is no object as long as the lenses 2 are arrayed and coupled with one another in the same manner.

In a laminate where the lens array 201 and another element array are laminated, the adhesive sheet 204 is released by heating or irradiation with ultraviolet rays so that the sheet member 203 belonging to the lens array 201 can be removed from the lens array 201.

The aforementioned self-alignment of the bonding agent 42 (see FIGS. 7A and 7B), the fit convex portion 13 and the fit concave portion 14 (see FIGS. 9 and 10) or the pinching portion 15 (see FIG. 11) may be used suitably as an alignment portion between each lens 2 belonging to the lens array 201 and each element belonging to another element array which are arrayed in the laminating direction when the lens array 201 and the other element array are laminated.

In addition, the adhesive sheet 204 is made elastic so that the lenses 2 in their array directions (row direction and column direction) can be displaced due to the elasticity of the adhesive sheet 204. On that occasion, a rigid substrate-like member may be used as the sheet member 203.

Figure 16:
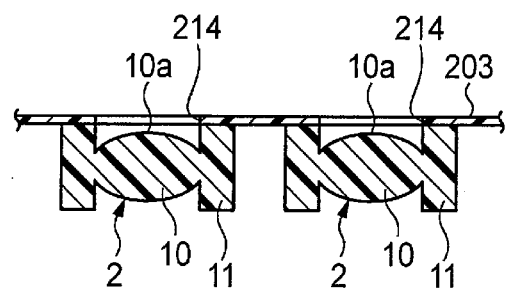
FIG. 16 is a view showing a modification of the element array in FIG. 14.

FIG. 16 shows a modification of the lens array 201 in FIG. 14.

In the lens array 201 shown in FIG. 16, a plurality of holes 214 arrayed in the same arrangement as the lenses 2 are formed in the sheet member 203. The holes 214 expose optical function portions 10 of the lenses 2 bonded to the sheet member 203. In the illustrated example, each hole 214 is formed to be large enough to expose the whole of an optical surface 10a of the optical function portion 10. For example, the hole 214 may be formed to be large enough to overlap with an outer edge of the optical surface 10a while the sheet member 203 is formed out of a light shielding material or a light shielding paint or the like is applied to the surface of the sheet member 203 so that apertures may be formed by the sheet member 203.

FIGS. 17A-17D show an example of a method for manufacturing the lens array 201 in FIG. 16. In the example shown in FIGS. 17A-17D, the sheet member 203 is inserted into a forming mold to form a plurality of lenses 2 bonded with the sheet member 203.

Figure 17:
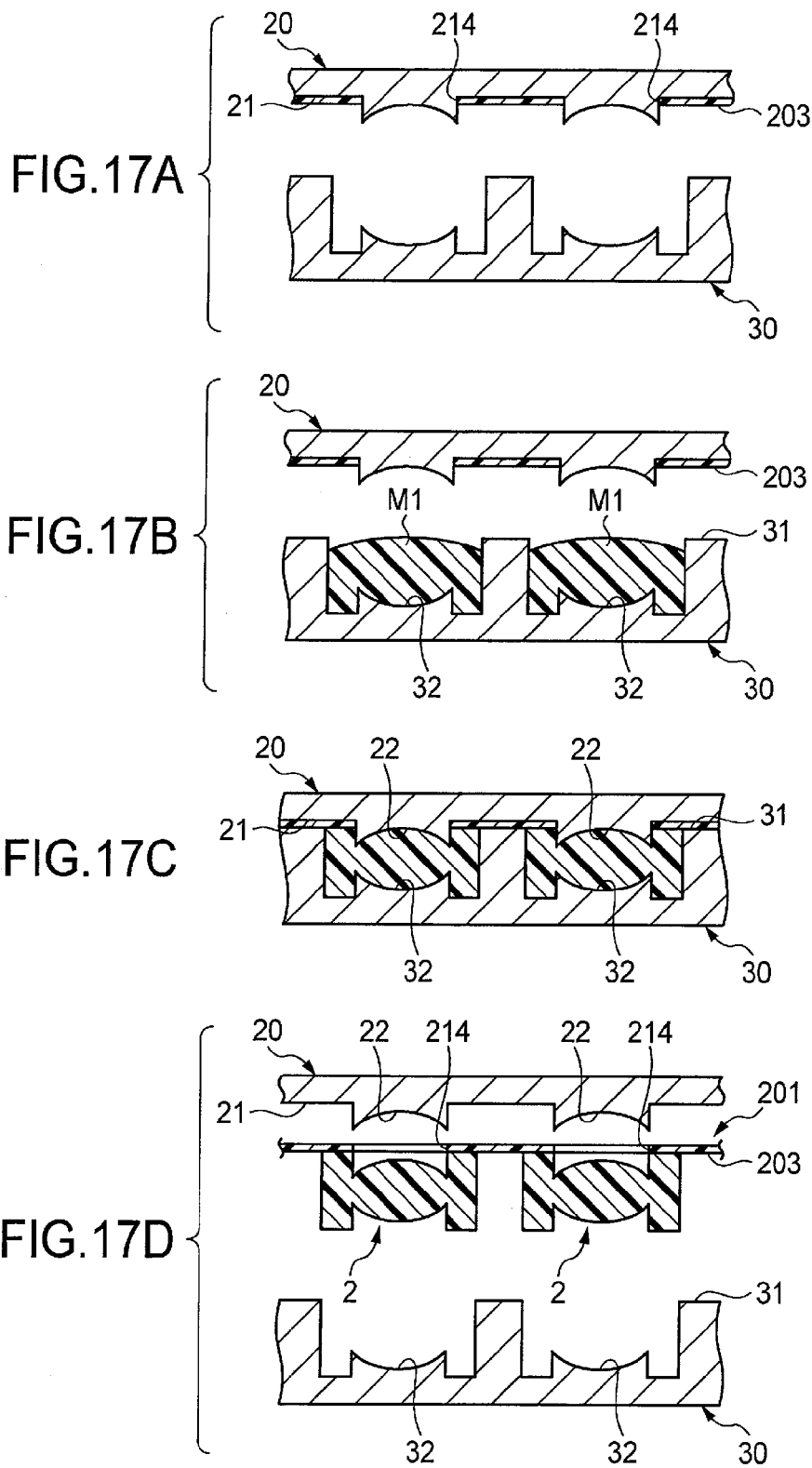
FIGS. 17A to 17D are views showing an example of a method for manufacturing the element array in FIG. 16.

As shown in FIG. 17A, the sheet member 203 is applied onto the molding surface 21 of the upper mold 20.

Next, as shown in FIG. 17B, a resin material M1 for forming the lenses 2 is dripped to each lens forming portion 32 of the lower mold 30.

Next, as shown in FIG. 17C, the upper mold 20 is moved down to compress the resin material M1 between the molding surface 21 of the upper mold 20 and the molding surface 31 of the lower mold 30. Thus, the resin material M1 is deformed in accordance with the molding surfaces 21 and 31.

Next, as shown in FIG. 17D, energy is applied to the resin material M1 to cure the resin material M1 and obtain the lens array 201. The lenses 2 are formed between the paired lens forming portions 22 and 32 respectively. The lenses 2 and the sheet member 203 are formed in the state where they are bonded with each other.

In this lens array 201, the holes 214 for exposing the optical function portions 10 of the lenses 2 are formed in the sheet member 203 so that the lens array 201 can be laminated with another element array without removing the sheet member 203 from the lens array 201.

Figure 18:
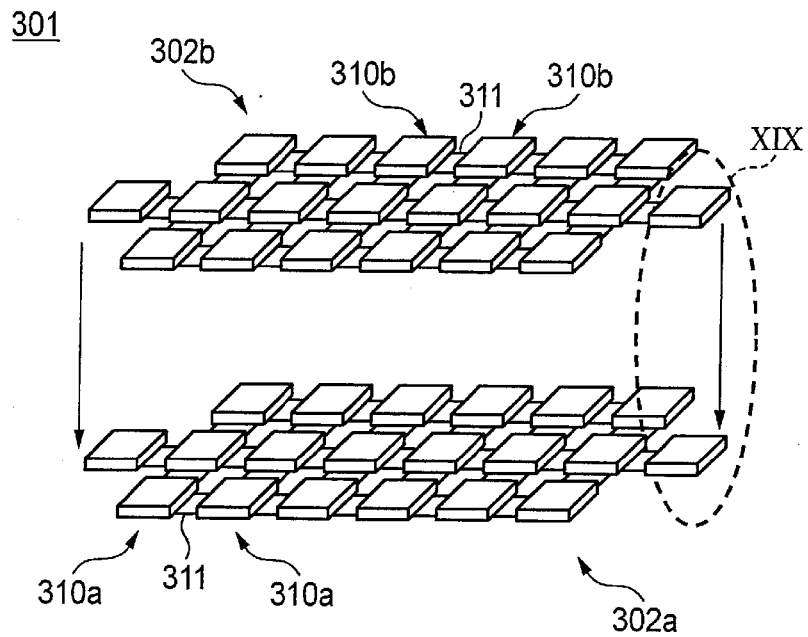
FIG. 18 is a view showing another example of an element array for explaining the embodiment of the invention, and a laminate thereof.

FIG. 18 shows another example of an element array, and a laminate thereof. The element array shown in FIG. 18 is a microchemical chip array in which a plurality of microchemical chips for medical diagnosis are arrayed. On the other hand, the element array laminate shown in FIG. 18 is a microchemical chip array laminate constituted by a plurality of microchemical chip arrays built into layers.

As shown in FIG. 18, a microchemical chip array laminate 301 is constituted by two microchemical chip arrays 302a and 302b built into layers.

The microchemical chip array 302a has a plurality of microchemical chips 310a and a plurality of elastic pieces 311 serving as a support. The microchemical chip array 302b has a plurality of microchemical chips 310b and a plurality of elastic pieces 311 serving as a support. The configuration of each part is basically common between the microchemical chip array 302a and the microchemical chip array 302b. Therefore, the following description will be made on only the microchemical chip array 302a.

In the microchemical chip array 302a, the microchemical chips 310a are arrayed like a matrix in the illustrated example. The layout of the microchemical chips 310a is not limited to the matrix, but may be a radial or concentrically annular array, another two-dimensional array or a one-dimensional array.

Each elastic piece 311 is provided between adjacent ones of the microchemical chips 310a. End portions of the elastic piece 311 are bonded to opposed surfaces of two microchemical chips 310a between which the elastic piece 311 is placed, so that the elastic piece 311 couples the two microchemical chips 310a with each other.

The elastic pieces 311 are formed out of a material richer in elasticity (richer in stretchability) than the material forming the microchemical chips 310a, so that flexibility can be given to the elastic pieces 311. Thus, the microchemical chips 310a can be displaced in their array directions (row direction and column direction).

Figure 19:
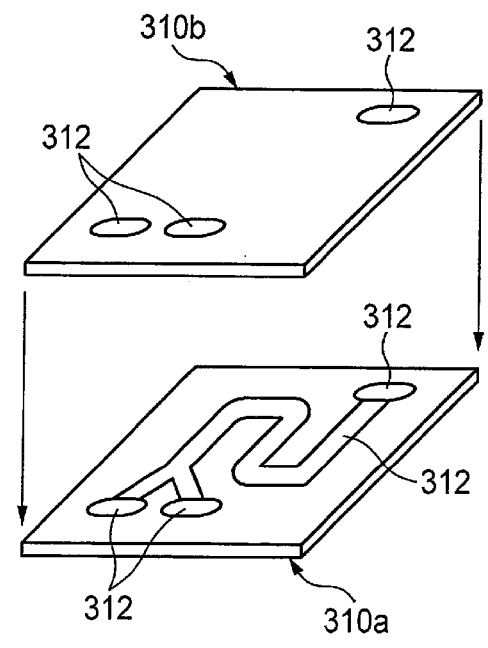
FIG. 19 is an enlarged view showing a portion surrounded by a dotted circle XIX in the element array laminate in FIG. 18.

FIG. 19 shows an enlarged view of the microchemical chips 310a and 310b in FIG. 18.

As shown in FIG. 19, microscopic channels 312 where sample liquid should be circulated are formed in the microchemical chips 310a and 310b. The channels 312 formed in the microchemical chips 310a and 310b respectively communicate with each other when the microchemical chips 310a and 310b are laminated. Each channel 312 is typically formed to have a width of several μm to several hundreds of μm. The accuracy required for alignment between the microchemical chips 310a and 310b is typically not larger than several μm.

Figure 20:
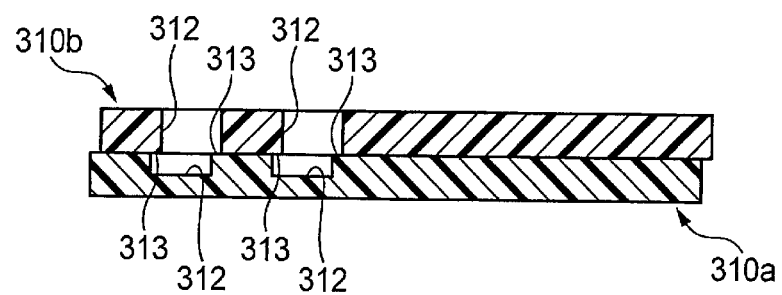
FIG. 20 is a view sectionally showing an element group included in the element array laminate in FIG. 18, in which the centers of a plurality of elements forming the element group are misaligned with each other, wherein description of some reference numerals and signs are set forth below.

FIG. 20 shows a state where the microchemical chips 310a and 310b in FIG. 18 are laminated while the centers of the microchemical chips 310a and 310b are misaligned with each other.

As shown in FIG. 20, when the microchemical chips 310a and 310b are laminated while the centers of the microchemical chips 310a and 310b are misaligned with each other, a step portion 313 occurs at the place where the channels 312 of the microchemical chips 310a and 310b are connected. When sample liquid is circulated through the step portion 313, there may arise a problem that an air pool is formed and a sample liquid pool is also formed to increase the amount of sample liquid required for diagnosis.

When the microchemical chips 310a and 310b are coupled with each other flexibly through the elastic pieces 311, it is possible to move one microchemical chip 310a in the pitch direction relatively to the other microchemical chip 310b while suitably expanding/contracting the elastic pieces 311. Thus, the microchemical chips 310a and 310b can be aligned so that the aforementioned problem can be solved. The aforementioned self-alignment of the bonding agent 42 (see FIGS. 7A and 7B), the fit convex portion 13 and the fit concave portion 14 (see FIGS. 9 and 10) or the pinching portion 15 (see FIG. 11) may be used suitably as an alignment portion between the microchemical chips 310a and 310b.

As explained above, an element array disclosed in the specification includes: a plurality of elements which are arrayed one-dimensionally or two-dimensionally, and a flexible support which is formed out of a material richer in elasticity than a material forming the elements; in which: the elements are coupled with one another through the support.

In addition, in an element array disclosed in the specification, the support is formed to fill a gap between each of the elements and another element around the element.

In addition, in an element array disclosed in the specification, at least one hole penetrating the support in a thickness direction thereof is formed in the support.

In addition, in an element array disclosed in the specification, the support includes a plurality of elastic pieces provided between adjacent ones of the elements respectively; and each of the elastic pieces is bonded to two of the elements between which the elastic piece is placed.

In addition, in an element array disclosed in the specification, the support is a sheet member; and each of the elements is bonded to one surface of the sheet member.

In addition, in an element array disclosed in the specification, each of the elements is removably bonded to the sheet member.

In addition, in an element array disclosed in the specification, a plurality of holes which expose function portions of the elements respectively are formed in the sheet member.

In addition, in an element array disclosed in the specification, the support is an adhesive sheet which is bonded to one surface of a substrate; and each of the elements is removably bonded to the adhesive sheet.

In addition, in an element array disclosed in the specification, each of the elements has a joint portion to be bonded to another element belonging to another element array and laid on the element; and an alignment portion for alignment with the other element is provided in the joint portion.

In addition, in an element array disclosed in the specification, the alignment portion is a fit portion which is fitted to the other element.

In addition, in an element array disclosed in the specification, a fit surface of the fit portion is a tapered surface.

In addition, in an element array disclosed in the specification, the alignment portion is a pinching portion which pinches the other element elastically in an array direction of the elements.

In addition, in an element array disclosed in the specification, the alignment portion is a pattern formed in a joint surface of the joint portion; and the pattern controls wettability to a bonding agent to express a self-alignment effect of the bonding agent.

In addition, an element array laminate disclosed in the specification, includes a plurality of element arrays built into layers and each having a plurality of elements arrayed one-dimensionally or two-dimensionally, each group of the elements arrayed in a laminating direction being aligned with one another, in which at least one layer of the element arrays is any one of the element arrays described above.

The invention has been described in detail or with reference to the specific embodiments. It is, however, obvious for those skilled in the art that various changes or modifications can be made without departing from the spirit and scope of the invention. This application is based on Japanese Patent Application No. 2009-227249 filed on Sep. 30, 2009, the entire content of which is hereby incorporated by reference, the same as if set forth at length.

INDUSTRIAL APPLICABILITY

The invention is useful when a plurality of structures each consisting of a plurality of elements built into layers are formed in a lump.

The invention claimed is:

1. An element array comprising:
a plurality of elements which are arrayed one-dimensionally or two-dimensionally, and a flexible support which is formed out of a material richer in elasticity than a material forming the elements; wherein:
the elements are coupled with one another through the support, and
the ratio of the stretchability of the material of the support to the stretchability of the material of the elements is more than or equal to 4.

2. The element array according to claim 1, wherein:
the support includes a plurality of elastic pieces provided between adjacent ones of the elements respectively; and
each of the elastic pieces is bonded to two of the elements between which the elastic piece is placed.

3. The element array according to claim 1, wherein:
the support is an adhesive sheet which is bonded to one surface of a substrate; and
each of the elements is removably bonded to the adhesive sheet.

4. An element array laminate comprising a plurality of element arrays built into layers and each having a plurality of elements arrayed one-dimensionally or two-dimensionally, each group of the elements arrayed in a laminating direction being aligned with one another, wherein:
at least one layer of the element arrays is an element array according to claim 1.

5. The element array according to claim 1, wherein:
the ratio of the stretchability of the material of the support to the stretchability of the material of the elements is in a range of 4 to 5.

6. The element array according to claim 1, wherein:
the support is formed to fill a gap between each of the elements and another element around the element.

7. The element array according to claim 6, wherein:
at least one hole penetrating the support in a thickness direction thereof is formed in the support.

8. The element array according to claim 1, wherein:
the support is a sheet member; and
each of the elements is bonded to one surface of the sheet member.

9. The element array according to claim 8, wherein:
each of the elements is removably bonded to the sheet member.

10. The element array according to claim 8, wherein:
a plurality of holes which expose function portions of the elements respectively are formed in the sheet member.

11. The element array according to claim 1, wherein:
each of the elements has a joint portion to be bonded to another element belonging to another element array and laid on the element; and
an alignment portion for alignment with the other element is provided in the joint portion.

12. The element array according to claim 11, wherein:
the alignment portion is a pinching portion which pinches the other element elastically in an array direction of the elements.

13. The element array according to claim 11, wherein:
the alignment portion is a pattern formed in a joint surface of the joint portion; and
the pattern controls wettability to a bonding agent to express a self-alignment effect of the bonding agent.

14. An element array laminate comprising a plurality of element arrays built into layers and each having a plurality of elements arrayed one-dimensionally or two-dimensionally, each group of the elements arrayed in a laminating direction being aligned with one another, wherein:
at least one layer of the element arrays is an element array according to claim 11.

15. The element array according to claim 11, wherein:
the alignment portion is a fit portion which is fitted to the other element.

16. The element array according to claim 15, wherein:
a fit surface of the fit portion is a tapered surface.

* * * * *